United States Patent
Nakatsu (10) Patent No.: US 6,827,878 B2
(45) Date of Patent: Dec. 7, 2004

(54) SPHERICAL PARTICLES OF RARE EARTH ACTIVATED BARIUM FLUORIDE HALIDE PHOSPHOR PRECURSOR

(75) Inventor: Masaharu Nakatsu, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/652,340

(22) Filed: Sep. 2, 2003

(65) Prior Publication Data

US 2004/0041126 A1 Mar. 4, 2004

(30) Foreign Application Priority Data

Aug. 30, 2002 (JP) ........................................ 2002-254853

(51) Int. Cl.$^7$ .............................................. C01K 11/61
(52) U.S. Cl. ............................... 252/301.4 H; 423/263; 423/466; 423/497
(58) Field of Search .................. 252/301.4 H; 423/263, 423/466, 497

(56) References Cited

U.S. PATENT DOCUMENTS 5,378,397 A * 1/1995 Ferretti ................. 252/301.4 H
6,531,073 B1 * 3/2003 Wakamatsu et al. . 252/301.4 H
6,638,447 B2 * 10/2003 Wakamatsu et al. . 252/301.4 H \* cited by examiner

*Primary Examiner*—C. Melissa Koslow
(74) *Attorney, Agent, or Firm*—Sughrue Mion, PLLC

(57) ABSTRACT

Spherical particles of a rare earth activated barium fluoride halide phosphor precursor having the formula(I):

$$Ba_{1-a}M^{II}{}_aFX{:}yM^I{,}zLn \qquad (I)$$

[in which $M^{II}$ is Ca or Sr; $M^I$ is Li, Na, K, Rb or Cs; X is Cl, Br or I; Ln is a rare earth element; and a, y and z are numbers satisfying the conditions of $0 \leq a \leq 0.5$, $0 \leq y \leq 0.05$, and $0 < z \leq 0.2$] are favorably employable for preparing spherical rare earth activated barium fluoride halide phosphor particles.

25 Claims, 1 Drawing Sheet

FIG. 1

SPHERICAL PARTICLES OF RARE EARTH ACTIVATED BARIUM FLUORIDE HALIDE PHOSPHOR PRECURSOR

FIELD OF THE INVENTION

The present invention relates to a phosphor precursor. Specifically, the invention relates to spherical particles of a precursor of a rare earth activated barium fluoride halide phosphor.

BACKGROUND OF THE INVENTION

It is known that a rare earth activated barium fluoride halide phosphor gives spontaneous emission in the ultraviolet or visible wavelength region when exposed to radiation such as X-rays and electron beams. This phosphor is, for example, used for a radiographic intensifying screen, in which the intensifying screen is used in combination with a radiographic photosensitive material.

The above-identified phosphor is also known as a stimulable phosphor. When the stimulable phosphor is exposed to radiation such as X-rays, it absorbs and stores a portion of the radiation energy. The stimulable phosphor then emits stimulated emission to release the stored energy when exposed to electromagnetic wave such as visible light or infrared rays (i.e., stimulating light). The aforementioned phosphor is, therefore, used for preparing a radiation image storage panel (i.e., imaging plate) in a radiation image recording and reproducing method.

The radiation image recording and reproducing method has been widely employed in practice, and it comprises the steps of: causing the stimulable phosphor contained in the radiation image storage panel to absorb radiation energy having passed through an object or having radiated from an object; sequentially exciting the stimulable phosphor with a stimulating light such as a laser beam to emit stimulated light; and photoelectrically detecting the emitted light to obtain electric signals giving a reproduced radiation image. The storage panel thus treated is subjected to a step for erasing radiation energy remaining therein, and then stored for the use in the next recording and reproducing procedure. Thus, the radiation image storage panel can be repeatedly used.

In the radiographic intensifying screen or radiation image storage panel, the rare earth activated barium fluoride halide phosphor is normally dispersed in a binder. The phosphor particles preferably are spherical so that they can be densely dispersed in the binder. If the particles have tabular shapes, they are apt to align horizontally (i.e., parallel to the plane of the screen or panel), and accordingly the emission is liable to diffuse horizontally to lower the quality (sharpness and graininess) of the resultant radiographic image. Further, the phosphor particles also preferably have such a small size-distribution (i.e., they preferably are monodispersed) that they can be evenly dispersed in a binder solution. In order to prepare the spherical and monodispersed phosphor particles efficiently and easily, it is desired that a phosphor precursor be in the form of spherical and monodispersed particles. Here, the term "phosphor precursor" or "precursor of phosphor" means a compound that is yet to be fired, that has almost the same formula as the phosphor to be obtained by firing, but that hardly or insufficiently emits luminescence, that is "non-luminescent".

Ordinarily, for preparing the rare earth activated barium fluoride halide phosphor, starting materials such as barium fluoride, barium halide, rare earth halide and ammonium fluoride are mixed under dry or wet conditions, and are then fired. The obtained phosphor is generally in the form of tabular particles.

Japanese Patent Provisional Publication No. 7-233369 discloses a stimulable rare earth activated alkaline earth metal fluoride halide phosphor [in the formula of $(Ba,M^{II})FX:M^I,Ln$ in which $M^{II}$ is Sr and/or Ca, $M^I$ is an alkali metal, X is a halogen other than F, and Ln is a rare earth element] in the form of tetradecahedral particles and a process for a preparation thereof. The phosphor is prepared by precipitating and firing a precursor of the phosphor in the form of tetradecahedral crystals. According to the publication, the tetradecahedral crystals of the precursor can be obtained by the steps of: preparing an aqueous solution in which $BaX_2$, a halide of Ln and, if needed, halides of $M^{II}$ and $M^I$ are dissolved so that the concentration of $BaX_2$ is 1.4 mol/L or less, and adding an aqueous solution of an inorganic fluoride to the prepared halide solution, while the temperature kept at 20 to 100° C.

Japanese Patent Provisional Publication No. 6-9956 discloses a process for preparation of a spherical rare earth activated barium fluoride halide phosphor. The process comprises the steps of: adding a mixture of phosphor particles and a binder to an organic solvent to prepare a slurry, spray-drying the slurry to form spherical binder-containing agglomerates, heating the agglomerates at a temperature of 200° C. to 500° C. for 0.5 to 5 hours to remove the binder, and firing the heated agglomerates at a temperature of 600° C. to 1,300° C. for 0.5 to 5 hours.

Japanese Patent Provisional Publication No. 10-251635 discloses a process for preparation of spherical phosphor particles having a mean size of 0.05 to 1 μm. In the process, a powdery phosphor (stating material) is treated in a heated non-oxidative stream.

In all the known processes, the starting material for the preparation of a phosphor is a phosphor, and there is no description of a phosphor precursor, which is non-luminescent. Further, it has not yet been reported that a spherical phosphor precursor s produced according to the liquid phase reaction process, which needs not a large-scale apparatus used in a thermal decomposition-spraying process. Naturally, the size distribution of the resultant phosphor particles greatly depends on that of the starting materials, and therefore it is necessary that the material particles be evenly dispersed before the treatment. However, there is known no method for evenly dispersing the starting material particles, and hence the resultant phosphor particles are considerably multidispersed.

SUMMARY OF THE INVENTION

It is an object of the present invention to provide a spherical precursor of a rare earth activated barium fluoride halide phosphor particle, from which the target spherical phosphor is advantageously prepared.

It is another object of the invention to provide a process by which the spherical precursor of rare earth activated barium fluoride halide phosphor particles is easily produced.

The applicant has studied the process for preparation of a rare earth activated barium fluoride halide phosphor in the form of spherical particles. As a result, it is found that, if a water-soluble polymer material is used under properly controlled reaction conditions, the precursor of the phosphor in the form of almost spherical and monodispersed particles can be easily prepared by the liquid phase reaction process. From the obtained spherical precursor, the phosphor in the form of almost spherical and monodispersed particles can be prepared.

The invention resides in non-luminescent spherical rare earth activated barium fluoride halide particles, that is, precursor particles having the formula (I):

$$Ba_{1-a}M''_aFX:yM',zLn \qquad (I)$$

in which $M''$ is at least one alkaline earth metal selected from the group consisting of Ca and Sr; $M'$ is at least one alkali metal selected from the group consisting of Li, Na, K, Rb and Cs; X is at least one halogen selected from the group consisting of Cl, Br and I; Ln is at least one rare earth element selected from the group consisting of Ce, Pr, Nd, Pm, Sm, Eu, Gd, Tb, Dy, Ho, Er, Tm, Yb and Lu; and a, y and z are numbers satisfying the conditions of $0 \leq a \leq 0.5$, $0 \leq y \leq 0.05$, and $0 < z \leq 0.2$, respectively.

In the present invention, the term of "non-luminescent spherical rare earth activated barium fluoride halide particles" means spherical rare earth activated barium fluoride halide particles which emit no luminescent radiation or emit only such a small amount of luminescence radiation that the particles per se are not practically employable for manufacturing a radiation intensifying screen.

The invention also resides in a process for preparing spherical rare earth activated barium fluoride halide phosphor particles, having the following formula (I):

$$Ba_{1-a}M''_aFX:yM',zLn \qquad (I)$$

in which $M''$ is at least one alkaline earth metal selected from the group consisting of Ca and Sr; $M'$ is at least one alkali metal selected from the group consisting of Li, Na, K, Rb and Cs; X is at least one halogen selected from the group consisting of Cl, Br and I; Ln is at least one rare earth element selected from the group consisting of Ce, Pr, Nd, Pm, Sm, Eu, Gd, Tb, Dy, Ho, Er, Tm, Yb and Lu; and a, y and z are numbers satisfying the conditions of $0 \leq a \leq 0.5$, $0 \leq y \leq 0.05$, and $0 < z \leq 0.2$, respectively; which comprises the steps of:

(1) dissolving at least a water-soluble polymer material and a halide containing an X ion in an aqueous medium, whereby preparing an aqueous solution in which the X ion is dissolved in an amount of 3.0 mol/L or more and which has a pH value in the range of 5.0 to 14.0 and a temperature in the range of 0° C. to 80° C.;

(2) mixing an aqueous barium compound solution, an aqueous fluoride solution, and an aqueous X ion-containing halide solution with the aqueous solution prepared in the first step while a resulting mixture solution is kept at a temperature in the range of 0° C. to 80° C., whereby forming barium fluoride halide particles in the mixture solution, (3) removing the water-soluble polymer material from the mixture solution containing the barium fluoride halide particles;

(4) mixing the mixture solution from the water-soluble polymer material is removed with an aqueous solution containing a rare earth compound, an alkaline earth metal compound and an alkali metal compound, the alkaline earth metal compound being not contained in the case of a=0 and the alkali metal compound being not contained in the case of y=0, whereby precipitating spherical rare earth activated barium fluoride halide particles;

(5) separating the spherical rare earth activated barium fluoride halide particles from the resulting mixture solution; and (6) firing the spherical rare earth activated barium fluoride halide particles whereby obtained the spherical rare earth activated barium fluoride halide phosphor particles.

The invention further resides in spherical rare earth activated barium fluoride halide phosphor particles, prepared by firing the above precursor and having the above-mentioned formula (I).

It should be noted that the component ratio of the precursor particle may be slightly different from that of the resultant phosphor particle because the chemical composition may vary during the firing procedure for producing the phosphor.

DETAILED DESCRIPTION OF THE INVENTION

The phosphor precursor of the invention is in the form of particles having a percentage of sphericity of preferably 50% or more, more preferably 70% or more, most preferably 90% or more. Here, the term "percentage of sphericity" means a percentage of surface areas other than crystal faces based on a total surface area of the particles.

The particles of the precursor have a mean size preferably in the range of 0.1 to 20.0 μm, more preferably in the range of 0.2 to 10.0 μm. The coefficient of variation of the particle size is preferably not more than 30%, more preferably not more than 20%.

In the formula (I), Ln preferably is Ce or Eu, and X preferably is Br and/or I.

Preferred embodiments of the process for preparation of the phosphor precursor of the invention are as follows.

(1) The water-soluble polymer material has an average molecular weight of 10,000 to 200,000, and is preferably gelatin.

(2) The gelatin is so modified that at least one carboxyl group per one amino group is introduced, and is more preferably a phthalated gelatin.

(3) The gelatin is so modified that at least two carboxyl groups per one amino group is introduced, and is more preferably a trimellitated gelatin.

(4) The concentration of the halide ion in the reaction mother liquid is in the range of 4.0 mol/L to saturation concentration.

(5) The X ion-containing halide is ammonium bromide.

(6) The temperature of the aqueous solution in the first and second steps is in the range of 5° C. to 60° C., more preferably in the range of 10° C. to 40° C.

(7) The pH value of the aqueous solution in the first step is in the range of 7.0 to 13.0, more preferably in the range of 8.0 to 12.0.

(8) The barium compound is barium acetate.

Figure 1:
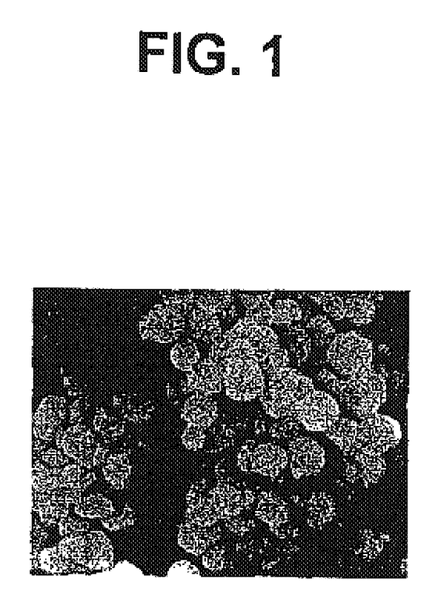
FIG. 1 is an electron micrograph showing an example of the phosphor precursor particles of the invention.

The rare earth activated barium fluoride halide phosphor precursor of the invention having the following formula (I) is in the form of spherical particles, as shown in FIG. 1.

Formula (I):

$$Ba_{1-a}M''_aFX:yM',zLn \qquad (I)$$

[$M''$ is at least one alkaline earth metal selected from the group consisting of Ca and Sr; $M'$ is at least one alkali metal selected from the group consisting of Li, Na, K, Rb and Cs; X is at least one halogen selected from the group consisting of Cl, Br and I; Ln is at least one rare earth element selected from the group consisting of Ce, Pr, Nd, Pm, Sm, Eu, Gd, Tb, Dy, Ho, Er, Tm, Yb and Lu; and a, y and z are numbers satisfying the conditions of $0 \leq a \leq 0.5$, $0 \leq y \leq 0.05$, and $0 < z \leq 0.2$, respectively.]

FIG. 1 is an electron micrograph showing an example of the phosphor precursor particles according to the invention (formula: $Ba_{0.99}Ca_{0.01}FBr:0.017K,0.005Eu$).

In the present specification, the term "spherical" means that the percentage of sphericity, which indicates the ratio of surface area other than flat crystal faces based on the total surface area of the particles observed under an electron microscope, is 50% or more. The higher the percentage of sphericity is, the better the particles can be regarded as spherical. The crystal faces of the particles can be assigned by the X-ray diffraction. The percentage of sphericity is preferably 70% or more, more preferably 90% or more, most preferably 95% or more.

The spherical particles of the phosphor precursor of the invention has a mean size generally in the range of 0.1 to 20.0 μm, preferably in the range of 0.2 to 10.0 μm, more preferably in the range of 0.5 to 7.0 μm. Here, the term "mean size" indicates a spherical volume-converted diameter (sphere-corresponding diameter) obtained from projected area of the particles. The projected area is determined by means of electron-microscopic observation of at least randomly selected 500 particles.

Further, the precursor particles of the invention has a small size distribution (i.e., they are monodispersed). The coefficient of variation in the size distribution of the precursor particles is generally not more than 30%, preferably not more than 20%, more preferably not more than 15%. Here, the term "coefficient of variation" means a ratio of the standard deviation from the mean size of the particles in terms of percentage.

In consideration of characteristics of spontaneous and stimulated luminescence of the phosphor obtained from the precursor of the invention, Ln in the formula (I) preferably is Ce or Eu. In the formula (I), X preferably is Br and/or I.

The aforementioned rare earth activated barium fluoride halide phosphor precursor of the invention can be prepared according to the liquid phase reaction process described below.

[Particle Formation]
(1) Preparation of Mother Liquid

First, a halide other than fluoride is dissolved in an aqueous medium to prepare a mother liquid. (In the present specification, the simple "halide" does not include a fluoride.)

Examples of the halides include ammonium chloride, hydrogen chloride, lithium chloride, sodium chloride, potassium chloride, ammonium bromide, hydrogen bromide, lithium bromide, potassium bromide, ammonium iodide, hydrogen iodide, lithium iodide, sodium iodide, and potassium iodide. These halide are optionally selected and used according to the composition of the desired precursor. Ammonium bromide is particularly preferred.

In a reaction vessel equipped with a stirrer, the mother liquid is stirred with the stirrer rotated at proper revolutions per minute. In this procedure, a small amount of acids, alkalis, alcohols or a powder of water-insoluble metal oxide fine particles may be added to the liquid, if needed.

The concentration of the halide ion in the mother liquid generally is 3.0 mol/L or more, preferably 4.0 mol/L or more, and more preferably 4.5 mol/L or more. If the concentration is less than 3.0 mol/L, the reaction yield lowers, and by-products are formed.

The temperature of the mother liquid is generally kept in the range of 0° C. to 80° C., preferably in the range of 5° C. to 60° C., more preferably in the range of 10° C. to 40° C. Since the temperature is an important factor in the shape and size of the formed particles, the temperature is preferably kept in the above range while the reaction proceeds.

The pH value of the mother liquid is generally in the range of 5.0 to 14.0, preferably in the range of 7.0 to 13.0, more preferably in the range of 8.0 to 12.0. Since the pH value is another important factor in the shape and size of the particles, the pH value is preferably kept in the above range, while the reaction proceeds.

To the mother liquid, a water-soluble polymer material is added. In the present invention, the reaction must proceed in the presence of the water-soluble polymer material. It is understood that because of adsorption of the water-soluble polymer, the almost spherical particles are formed. Here, the term "reaction" means a process in which the particles are produced and grow. It is important that the water-soluble polymer is present at least in the early stage of the reaction. Hitherto, it has not yet been concretely reported that a water-soluble polymer is used for preparing a phosphor precursor in the form of spherical particles.

The water-soluble polymer material has an average molecular weight generally in the range of 10,000 to 200,000. If the molecular weight is less than 10,000, the particles are formed with a very small size. On the other hand, if it is more than 200,000, residues adsorbed on the particles are liable to cause undesired effects in the latter steps. The amount of the polymer can be determined according to the desired size of the particles, and is generally in the range of 0.01 to 100 g/L, preferably in the range of 0.1 to 50 g/L, more preferably in the range of 0.5 to 20 g/L.

The water-soluble polymer material may be added together with an aqueous solution of a fluoride in the second step, or otherwise it may be added in both the first and second steps.

As the water-soluble polymer material, gelatin is preferably used in the invention. The gelatin is preferably so modified that at least one carboxyl group (—COOH) per one amino group (—NH$_2$) is introduced. Examples of the thus modified gelatin include a phthalated gelatin. More preferably, the gelatin is so modified that at least two carboxyl groups (—COOH) per one amino group (—NH$_2$) is introduced. Examples of the thus modified gelatin include a trimellitated gelatin.

The amino group (—NH$_2$) in the modified gelatin may be the terminal amino group of gelatin molecule or an amino in lysine, hydroxylysine, histidineor arginine group. If an arginine group is converted into an ornithine group, it may be —NH$_2$ in the ornithine group. Further, the —NH$_2$ may be in an impure group such as adenine or guanine group. For chemically modifying —NH$_2$, a reaction reagent is added to gelatin and made to react with —NH$_2$ so as to form a covalent bond or so as to remove the amino group. In other words, the chemical modification of —NH$_2$ means that a primary amino (—NH$_2$) group is removed or converted into a secondary (—NH—) or tertiary (—N<) one.

Examples of the reaction reagents include acid anhydrides (e.g., maleic anhydride, o-phthalic anhydride, succinic anhydride, isatoic anhydride, benzoic anhydride), acid halides (e.g., R—COX, R—SO$_2$X, R—O—COX, C$_6$H$_5$—COCl in which R is an alkyl group), compounds having aldehyde groups (e.g., R—CHO), compounds having epoxy groups, deamination agents (e.g., HNO$_2$, deaminase), active esters (e.g., sulfonic acid esters, p-nitrophenyl acetate, isopropenyl acetate, methyl-o-chlorobenzoate, and p-nitrophenyl benzoate), isocyanates (e.g., aryl isocyanates), active halides (e.g., aryl halides such as benzyl bromide, biphenyl halomethane, benzoyl halomethane, phenylbenzoyl halomethane and 1-fluoro-2,4-dinitrobenzene; β-ketohalide; α-halofatty acid); β-halonitrile; and chloro derivatives of s-triazine, pyrimidine, pyridazine, pyrazine, pyridazone, quioxaline, quinazoline, phthalazine, benzoxazole, benzothiazole and benzoimidazole), carbamoylizing agents (e.g., cyanate, nitrourea), compounds having acrylic active double bonds (e.g., maleimide, acrylamine, acrylamide, acrylonitile, methyl methacrylate, vinyl sulfone, vinyl sulfonate, styrene, vinyl pyridine, acryl amine, butadiene, isoprene, and chloroprene), sulfones (e.g., butane sulfone and propane sulfone), guanidinizing agents (e.g., o-methyl isourea), and carboxyl azides.

A reagent mainly reacting with —$NH_2$ is preferred to one concurrently reacting with —OH or —COOH in gelatin. The term "reagent mainly reacting with —$NH_2$" means a reagent reacting with —$NH_2$ in an amount of 60% or more, preferably in an amount of 80% to 100%, more preferably in an amount 95% to 100%. It is also preferred that the formed reaction product contain essentially no groups in which oxygens in ether or ketone groups are replaced with other chalcogen atoms such as —S— (for example, thione if the chalcogen atom is S). The term "essentially no groups" means that preferably 10% or less, more preferably 0 to 3% of the chemically modified groups are replaced with other chalcogen atoms. Accordingly, preferred reaction reagents are acid anhydrides, sulfones, compounds having active double bonds, active halides, isocyanates, active esters, compounds having aldehyde groups and deamination agents. It is further preferred that the chemical modification forms essentially no crosslinking among the gelatin molecules. The term "essentially no crosslinking" means that preferably 10% or less, more preferably 0 to 3% of the chemically modified groups are crosslinked.

The processes, reagents and other descriptions of the chemical modification are given in detail in, for example, Japanese Patent Provisional Publication Nos. 4-226449, 50-3329, U.S. Pat. Nos. 2,525,753, 2,614,928, 2,614,929, 2,763,639, 2,594,293, 3,132,945; "Glue and Gelatin (Japanese)", edited by Yoshihiro Abiko, Chapter II (1987); and "The science and Technology of Gelatin", by Ward et al., Chapter 7, Academic Press (1977). The extent of the gelatin is chemically modified can be determined in the following manner. First, a non-modified gelatin and the modified gelatin are prepared and the number of —$NH_2$ groups in each gelatin is measured. From the obtained numbers of —$NH_2$ groups, the percent degree of chemical modification is then calculated according to the formula: $100 \times (e_1-e_2)/e_1$ in which $e_1$ and $e_2$ are the numbers of —$NH_2$ groups in the non-modified and modified gelatins, respectively. The $e_1$ and $e_2$ can be determined on the basis of, for example, IR absorption intensity of —$NH_2$ group, NMR signal intensity of proton in $NH_2$ group, coloration or fluorescence of —$NH_2$ group. These quantifying methods are described in detail in, for example, "Handbook of Analytical Chemistry (Japanese)—Organic substances II-", Maruzen (1991). Further, other quantifying methods such as the formol titration method and the method of comparing titration curves of the non-modified and modified gelatins may be used. They are described in detail in, for example, "The science and Technology of Gelatin", Chapter 15, Academic Press (1977).

(2) Formation of Particles

After the aforementioned procedure, an aqueous solution of barium compound, an aqueous solution of fluoride and an aqueous solution of halide are added to the mother liquid, while the temperature of the mother liquid is maintained.

The barium compound is preferably easily dissolved in water. Examples of the barium compounds include barium acetate, barium nitrate, barium hydroxide, and barium benzoate. Barium acetate is particularly preferred. The concentration of the barium compound preferably is 0.5 mol/L or more. If the concentration is too low, the production yield lowers. Accordingly, from the viewpoint of productivity, the concentration of the barium compound is preferably kept at a high level.

Examples of the fluoride include ammonium fluoride, hydrogen fluoride, lithium fluoride, sodium fluoride, and potassium fluoride. Ammonium fluoride is particularly preferred. The concentration of the fluoride preferably is 0.5 mol/L or more. If the concentration is too low, the production yield lowers. Accordingly, from the view-point of productivity, the concentration of the fluoride is preferably kept at a high level.

Examples of the halides are the same as those described above. Ammonium bromide is particularly preferred. The concentration of the halide preferably is 0.5 mol/L or more.

The above-mentioned aqueous solutions may be separately added according to the triple-jet method. Otherwise, after the halide solution is beforehand mixed with the fluoride solution or barium compound solution, the mixed solutions may be added together with the other solution according to the double-jet method. In any process, the solutions are preferably added at the same time. Then, a reaction proceeds to give barium fluoride halide particles in the reaction solution. In the formation of the particles, the water-soluble polymer material such as gelatin is adsorbed on the surfaces of the particles and spherical particles are produced.

To the mother liquid, an aqueous solution containing a rare earth compound and, if needed, an alkaline earth metal compound and an alkali metal compound are then added to precipitate a precursor of spherical rare earth activated barium fluoride halide phosphor particles.

Examples of the rare earth compounds include halides (chloride, bromide, and iodide), nitrate and acetate.

Besides the rare earth compound, an alkaline earth metal (other than barium) compound and/or an alkali metal compound may be incorporated into the solution. Examples of the alkaline earth metal compounds include halides, nitrate, nitrite, and acetate. Examples of the alkali metal compounds include halides, nitrate, nitrite, and acetate.

The rare earth compound and, if needed, the alkaline earth metal compound and the alkali metal compound may be added to the solution in the first step, instead of in the second step. Otherwise, the aqueous solution containing them may be added after removing the water-soluble polymer material.

(3) Removal of Water-Soluble Polymer Material (Ripening)

From the above-prepared reaction solution containing the particles, the water-soluble polymer material is removed. The polymer material can be removed, for example, using a protease. There are no specific restrictions on the protease, as long as the protease does not impair characteristics (such as emission characters) of the resultant phosphor, and hence known protease can be used. A suitable amount of the protease is added to the reaction solution, and then stirred and ripened for several minutes to a few hours. During the ripening stage, the temperature and the pH value of the reaction solution are kept in the same ranges as those described above for the reaction stage. The water-soluble polymer material adsorbed on the particle surface is effectively removed in the ripening stage.

[Separation of Solid Phase]

The precipitated particles of phosphor precursor are separated from the reaction solution by means of, for example, suction filtration, pressure filtration, or centrifugation. The separated particles are washed well with a lower alcohol such as methanol, ethanol, or propanol, to remove impurities such as a salt, and then dried at a temperature of 70° C. to 200° C. to evaporate water and alcohol.

Thus, the aforementioned spherical rare earth activated barium fluoride halide phosphor precursor particles having the formula (I) are obtained under the condition of monodispersion.

From thus obtained precursor, the rare earth activated barium fluoride halide phosphor of the invention can be prepared. The process for preparing the phosphor is described below.

[Mixing of Starting Materials]

The phosphor precursor particles can be fired alone, but, if needed, other phosphor materials may be weighed and mixed.

Examples of the phosphor materials other than the precursor include barium halides (e.g., $BaF_2$, $BaCl_2$, $BaBr_2$, $BaI_2$, BaFCl, BaFBr, BaFI, BaF(Br, I)), alkaline earth metal halides (e.g., $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$), alkali metal halides (e.g., LiF, LiCl, LiBr, LiI, NaF, NaCl, NaBr, NaI, KF, KCl, KBr, KI, RbF, RbCl, RbBr, RbI, CsF, CsCl, CsBr, CsI), metal oxides (e.g., $Al_2O_3$, $SiO_2$, $ZrO_2$), various other compounds (such as halides, oxide, nitrate and sulfate) of rare earth elements (Ce, Pr, Nd, Pm, Sm, Eu, Gd, Tb, Dy, Ho, Er, Tm, Yb), and ammonium halides ($NH_4X'$ in which X' is F, Cl, Br or I).

Further, in order to improve emission characteristics (such as emission intensity and erasability of stored radiation energy) of the resultant phosphor, various other components may be added. They are, for example, elements other than those contained in the precursor. Examples of them include non-metal elements (e.g., B, O, S, As), amphoteric elements (e.g., Al, Ge, Sn), metal elements (e.g., V, Be, Mn, Fe, Ni, Co, Cu, Ag), tetrafluoroborate, and hexafluoro compounds.

The above-described materials can be mixed with the precursor particles according to various known mixing methods. For example, the materials are simply weighed and mixed with the precursor particles. Otherwise, part or all of the materials are weighed and mixed to prepare a mixture, which is then heated at 100° C. or above for several hours. The heated mixture is mixed with the reserved materials and/or the precursor. It is also possible that all the above-mentioned materials and precursor particles are mixed in a suspension, which is then dried under reduced pressure or in vacuum, or sprayed to dry at a temperature of 30° C. to 200° C. In other different way, a part of the above-mentioned materials and the precursor particles are mixed in a suspension, which is dried to prepare a mixture. The mixture is then mixed with the remaining materials.

In mixing the above-mentioned materials and precursor particles, desired mixing means may be used to give shearing force or to control various conditions such as timing of adding the materials. As the mixing means, known means can be optionally adopted. Examples of them include various mixers, V-blender, ball mill, rod mill, jet mill and automatic mortar.

[Firing]

In the present specification, the term "firing" means a heat treatment by which the precursor particles or the mixture of precursor particles and other materials are given desired emission characteristics to give the desired phosphor particles. Prior to the step of firing, the below-described pre-firing may be carried out.

(Pre-Firing)

In the step of pre-firing, the precursor particles or the mixture thereof are heated at a temperature lower than the temperature in the step of (main) firing. The main firing promotes, at a higher temperature, not only synthesis of the phosphor (mixed) crystal but also diffusion of the activator into the matrix crystal, and accordingly it plays both roles of synthesizing the (mixed) crystal and giving the emission characteristics (such as characteristics on instant emission, stimulated emission and afterglow). In contrast, the pre-firing is carried out at a lower temperature mainly for the purpose of synthesizing the phosphor (mixed) crystal. The roles of the main firing and pre-firing steps are clearly separated from each other. Therefore, it is very easy to control freely the emission characteristics of the resultant phosphor.

Since the pre-firing is carried out not for imparting to the precursor particles emission characteristics, the pre-firing can be performed without strictly controlling the atmosphere. It, therefore, can be conducted in a simple furnace while the main firing must be done in a firing furnace under the strictly controlled atmosphere. Further, since various components that are to escape from the precursor particles or the mixture thereof are evaporated away during the pre-firing, there remains only a small amount of the volatile materials before the pre-fired material is subjected to the main firing. Accordingly, they are kept from contaminating the firing furnace in which the atmosphere must be strictly controlled. As a result, the emission characters of the resultant phosphor can be reliably controlled and the maintenance of firing furnace can be made easy. In order to prevent the contamination, the precursor particles and other phosphor materials may be individually subjected to the pre-firing and then mixed and subjected to the main firing.

The pre-firing is conducted at a temperature of 200° C. to 900° C., which is lower than the temperature in the main firing. If it is lower than 200° C., the components that are to escape are insufficiently removed. If the temperature is above 900° C., the pre-firing may affect the emission characteristics. In other wards, the pre-firing should be carried out at a temperature at which any emission characteristics are not given to the synthesized phosphor crystal. The temperature in the pre-firing preferably is in the range of 300° C. to 700° C., more preferably in the range of 500° C. to 600° C. The difference between the temperature in the pre-firing and that in the main firing depends upon various conditions (such as time for the pre-firing and composition of the precursor particles or the mixture thereof), but is generally 20° C. or more, preferably 50° C. or more, further preferably 100° C. or more.

The period of time for the pre-firing is generally in the range of 0.1 to 10 hours, preferably in the range of 0.5 to 5 hours, more preferably in the range of 1 to 3 hours. If it is less than 0.1 hour, various volatile components insufficiently evaporate away and the phosphor crystal can not be satisfactorily synthesized. However, even if the pre-firing is conducted for more than 10 hours, no additional effects can be obtained.

It is not necessary to control strictly the atmosphere in the pre-firing, and hence any furnace can be used as long as the pre-firing can be done at the above-mentioned temperature. Examples of the furnaces include muffle furnace, rotary kiln and atmospheric furnace. In consideration of productivity, particularly preferred is a continuous furnace (tunnel kiln), in which the firing can be continuously conducted.

In the pre-firing step, a container charged with the precursor particles or the mixture thereof are placed in a furnace such as a tunnel kiln. The container may be a quartz boat, which is generally used for firing. The container is preferably composed of a body and a lid. In order that the body be sealed with the lid, the peripheral part of the lid and the edge around the opening of the body preferably is in close contact. For the purpose of that, the face of the peripheral part and the face of the edge are preferably made of ground glass. Further, between the above-mentioned faces, a sealing agent (material that solidifies or melts at the temperature of pre-firing) is preferably provided. The sealed container having that structure properly keeps the precursor particles or the mixture thereof from contact with air, and keeps appropriate atmosphere for the firing. Here, the term "sealed" does not mean that gases are completely prevented from coming into or out of the container. Inner gases may leak out of the container when the inner pressure increases, and outer gases may come in when the pressure decreases. The container is made of, for example, alumina, quartz, SiC, SiN, carbon, platinum. Further, the container may have a dual structure. In that case, the inner container may be filled with the precursor particles or the mixture thereof while powder of carbon black may be placed between the inner container and the outer container. The powder of carbon black reduces oxygen gas remaining in the container.

It is not always necessary to pulverize the product of the pre-firing, but the product may be slightly treated with a mortar in consideration of particle size of the resultant phosphor or evenness of the fired product.

(Main Firing)

1) Charging a Heat-resistant Container with the Pre-fired Product

First, the pre-fired product or, if the pre-firing is not conducted, the precursor particles or the mixture thereof, are placed in a heat-resistant container such as a quartz boat or a quartz crucible. The container is preferably so charged that the contained material (i.e., the pre-fired product, the precursor particles or the mixture thereof) may occupy 10% to 60% of the inner volume. The contained material is preferably laid to form a layer of even thickness. In the layer, the difference between the thickness at the thickest point and that at the thinnest point is preferably not more than 50% of the average thickness of the layer. If the material in the container occupies less than 10% of the inner volume, the productivity lowers. On the other hand, if it is more than 60% or if the layer of the material has an uneven thickness, the material is fired under uneven atmosphere (along the thickness). As a result, impaired or uneven emission characteristics are often given to the resultant phosphor.

2) Firing

The heat-resistant container charged with the material is placed in a heated electric furnace. In placing the container, the furnace is opened and hence air comes in. In order to prevent the material in the furnace from contact with a great deal of air at a high temperature, the inner atmosphere is preferably replaced with an inert gas after the container is placed in the furnace. For example, after the container is placed at a low-temperature site (below 500° C.) in the furnace, the furnace is closed and evacuated with an exhaust system such as a vacuum pump. Into the evacuated furnace, an inert gas is introduced. While the inert gas atmosphere is kept, the container is moved with transferring means (e.g., extruding rod) to the firing position. Otherwise, a furnace equipped with a gas-exchangeable chamber may be used.

The gas-exchangeable chamber is connected to the core of the furnace, but gases can not flow between the chamber and the core. In a different way, the furnace is not beforehand pre-heated and the container is placed at a site evenly heated. After the inner atmosphere is replaced with an inert gas, the main firing is started.

As the firing furnace, a tube furnace is preferred. However, various other furnaces can be used as long as the firing atmosphere can be optionally controlled. If a rotary kiln is used, the firing can be conducted without the heat-resistant container. In that case, the material is directly placed in the core tube. While the core tube is kept rotating, the firing can be carried out on the material evenly exposed to the firing atmosphere.

The furnace must have a volume for firing in the range of 2 to 500 L for 1 kg of the material (i.e., the pre-fired product, the precursor particles or the mixture thereof). The volume for firing is preferably in the range of 5 to 50 L per 1 kg of the material. If it is less than 2 L, the phosphor is packed in a small space too closely to fire evenly the whole of the material. In contrast, if it is more than 500 L, the evaporated halogen gas is so diffused that the resultant phosphor becomes to have impaired emission characteristics.

The firing furnace preferably has a structure in which the atmosphere in the core can be exchanged and in which the firing under near vacuum can be continued for a certain period of time. Accordingly, opening-closing apparatuses and driving parts in the furnace are preferably sealed well (i.e., the leak rate is preferably 15 Pa/min. or less), and the furnace is preferably equipped with an exhaust system whose exhausting rate is 1.0×Va L/minute or more (Va: volume of firing space). Examples of the exhaust system include oil rotary pump, oil diffusion pump, mechanical booster pump, turbo molecular air pump, cryo pump, and combinations thereof.

The firing temperature is generally in the range of 500° C. to 1,000° C., preferably in the range of 700° C. to 900° C. If it is lower than 500° C., satisfactory emission characteristics are not obtained. If it is higher than 1,000° C., the matrix crystal is liable to melt. The firing may be conducted at a constant temperature during the step, or the temperature may be gradually lowered (cooled) in the late stage of firing.

The firing is conducted generally for 0.5 to 12 hours, preferably for 1 to 5 hours. If the firing time is shorter than 0.5 hour, satisfactory emission characteristics are not obtained. However, even if the firing is conducted for more than 12 hours, any additional effect can not be obtained and the productivity is often impaired.

The firing is conducted under neutral or weak oxidative atmosphere. The neutral atmosphere can be obtained using, for example, inert gases such as He, Ne, Ar and $N_2$. The term "weak oxidative atmosphere" means an atmosphere of an inert gas containing oxygen gas in an amount of 100 to 100,000 ppm, preferably 150 to 50,000 ppm per one volume unit. In some cases, an atmosphere of an inert gas containing a small amount of hydrogen or an atmosphere of carbon dioxide containing carbon monoxide may be adopted.

If the weak oxidative atmosphere is used, oxygen gas is introduced at room temperature in an amount of generally 0.1 to 200 mL, preferably 0.2 to 100 mL per 1 L of the firing space. If the amount is less than 0.1 mL, the resultant phosphor often has poor characteristics in the step of erasing the stored radiation energy. In contrast, if it is more than 200 mL, the resultant phosphor often gives very weak stimulated emission.

A predetermined amount of oxygen gas may be introduced, for example, after the furnace is once evacuated to near vacuum. In that case, the degree of vacuum is preferably 15 Pa or below so as to control preciously the amount of oxygen in the atmosphere. After oxygen gas is introduced, the furnace is filled with an inert gas so that the inner pressure may return to near atmospheric pressure. In this way, not only a precious amount of oxygen gas can be introduced, but also other gases can be kept from affecting the firing. Instead of oxygen gas, a mixed gas containing oxygen gas (e.g., air) may be used. In that case, the amount of the mixed gas is so controlled that oxygen may be in the desired amount. Further, the atmosphere in the furnace may be replaced with an inert gas containing a variable amount of oxygen so that the amount of oxygen in the furnace can be continuously or step-by-step changed. Furthermore, the furnace may be simply filled with neutral or weak oxidative atmosphere containing a small amount of oxygen gas at atmospheric pressure. Immediately after the firing starts, it is not necessary to introduce oxygen gas into the furnace. For example, the firing is conducted under an inert gas atmosphere in the early stage, and then oxygen gas may be introduced in the aforementioned manner.

For not only introducing oxygen gas but also promoting evaporation of halogen gas, the furnace in the firing is preferably once or more evacuated for 1 to 30 minutes (in each exhausting procedure). The furnace does not always need to be evacuated to near vacuum, as long as the pressure in the core is made to become lower than atmospheric pressure. Thus, halogen gas can be evaporated enough to enhance the intensity of luminescence emitted from the resultant phosphor.

The atmosphere in the core may be controlled in a manner other than described above. Various conditions such as timing of introducing and exhausting gases, firing temperature control and firing time are optionally determined.

[Cooling]

The product obtained by the firing is kept shielded from air, and cooled while the neutral or weak oxidative atmosphere in the firing is exhausted or replaced with a predetermined atmosphere. This cooling step is generally conducted immediately after the firing step (in which the temperature may be gradually lowered in the late stage), but the product may be step-by-step cooled at variation of the cooling rate and/or the cooling atmosphere.

In the cooling step, the average cooling rate (at which the firing temperature is lowered to the take-out temperature, at which the fired product is taken out of the furnace) is generally in the range of 0.1 to 5° C./min., preferably in the range of 0.3 to 2° C./min. In the case where the product is step-by-step cooled, plural intermediate temperatures are set between the firing temperature and the take-out temperature so that the cooling temperature range may be divided into some stages. In each stage, the product is cooled at each different average cooling rate.

The product may be either left to cool down naturally or forced to cool down, while the temperature is controlled by means of cooling apparatus. In order to shorten the cooling time and to prepare stably the phosphor having good characters, it is preferred to cool the product at a temperature controlled at a predetermined level. Examples of the cooling apparatuses include air-cooling coolers (e.g., cooling fan) and water-cooing coolers.

The cooling is preferably conducted under vacuous, neutral or weak oxidative atmosphere. In the step-by-step cooling, each cooling stage may be conducted under each different atmosphere. If vacuous atmosphere is adopted, the degree of vacuum is preferably 15 Pa or less, more preferably 1.5 Pa or less. Preferred neutral and weak oxidative atmospheres are the same as those described in the firing.

The heat-resistant container is thus cooled to preferably 500° C. or below, more preferably 300° C. or below. After the cooling step is complete, the container charged with the product is taken out of the furnace. The fired product may be further cooled, if needed.

Thus, the desired spherical and monodispersed particles of the rare earth activated barium fluoride halide phosphor crystal having the formula (I) can be prepared.

The obtained phosphor of the invention can be used in various phosphor-containing materials. In particular, the phosphor of the invention is preferably used as a stimulable phosphor in-a radiation image storage panel.

The present invention is further explained in detail in the following examples.

EXAMPLE 1

(1) Preparation of Phosphor Precursor Particles

In water, 783.5 g of $NH_4Br$ and 40.0 g of gelatin (average molecular weight:approx. 100,000) were dissolved. The pH value of the solution was adjusted at 8.4 by addition of aqueous ammonia, to prepare 1,641 mL of a mother solution. The resulting mother solution was placed in a reaction vessel equipped with a stirrer, and stirred at 40° C.

While the temperature of the mother solution was kept, 250 mL of 2 M aqueous barium acetate solution and 250 mL of aqueous ammonium fluoride-ammonium bromide solution (containing 0.5 mol of $NH_4F$ and 0.5 mol of $NH_4Br$) were simultaneously added to the mother solution at the same pouring rates. After the liquid was left for 5 minutes, 116 mL of acetic acid was added. The mother solution was then further left for 30 minutes.

Successively, 100 mL of an aqueous protease solution (containing 0.5 g of actinase E [trade name]) was added to the mother solution, which was then left for ripening.

Thereafter, 33.2 mL of aqueous solution containing $2.5 \times 10^{-3}$ mol of $EUBr_3$, $5.0 \times 10^{-3}$ mol of $CaBr_2$ and $8.5 \times 10^{-3}$ mol of KBr) was added. The mother solution was then left again for 10 minutes for performing further ripening, to precipitate phosphor precursor particles.

The phosphor precursor particles were collected by filtration, washed with 2 L of methanol, and dried in vacuum at 120° C. for 4 hours. Thus, 103 g of phosphor precursor particles of europium activated barium fluoride bromide $(Ba_{0.99}Ca_{0.01}FBr:0.017K,0.005Eu)$ phosphor were obtained.

(2) Preparation of Phosphor

To the obtained precursor particles, 0.5 wt. % of alumina fine powder was added. After mixed well in a mixer, the mixture was stuffed in a quartz boat and fired in a tube furnace. The firing was conducted first at 700° C. under oxygen gas atmosphere for 30 minutes, and then at 800° C. under nitrogen gas atmosphere for 2 hours. Thus, phosphor particles of europium activated barium fluoride bromide $(Ba_{0.99}Ca_{0.01}FBr:0.017K,0.005Eu)$ of the invention were obtained.

It was confirmed, by means of scanning electron microscope, that the obtained phosphor precursor particles and the phosphor particles were spherical.

EXAMPLE 2

In water, 783.5 g of $NH_4Br$ and 20.0 g of phthalated gelatin (average molecular weight:approx. 100,000) were dissolved. The pH value of the solution was adjusted at 8.4 by addition of aqueous ammonia, to prepare 1,641 mL of a mother solution. The solution was placed in a reaction vessel equipped with a stirrer, and stirred at 30° C. Thereafter, except for using the thus-prepared mother solution, the procedures of Example 1 were repeated to obtain a precursor and a phosphor of europium activated barium fluoride bromide of the invention in the form of particles.

It was confirmed, by means of scanning electron microscope, that the phosphor particles and precursor particles were spherical.

EXAMPLE 3

In water, 783.5 g of $NH_4Br$ and 10.0 g of trimellitated gelatin (average molecular weight:approx. 100,000) were dissolved. The pH value of the solution was adjusted at 8.4 by addition of aqueous ammonia, to prepare 1,641 mL of a mother solution. The solution was placed in a reaction vessel equipped with a stirrer, and stirred at 30° C. Thereafter, except for using the thus-prepared mother solution, the procedure of EXAMPLE 1 was repeated to obtain a precursor and a phosphor of europium activated barium fluoride bromide of the invention in the form of particles.

It was confirmed, by means of scanning electron microscope, that the phosphor particles and the precursor particles were spherical.

EXAMPLE 4

In water, 783.5 g of $NH_4Br$ and 20.0 g of gelatin (average molecular weight:approx. 15,000) were dissolved. The pH value of the solution was adjusted at 8.4 by addition of aqueous ammonia, to prepare 1,641 mL of a mother solution. The mother solution was placed in a reaction vessel equipped with a stirrer, and stirred at 30° C. Thereafter, except for using the thus-prepared mother solution, the procedures of Example 1 were repeated to obtain a precursor and a phosphor of europium activated barium fluoride bromide of the invention in the form of particles.

It was confirmed, by means of scanning electron microscope, that the phosphor particles and the precursor particles were spherical.

EXAMPLE 5

In water, 562.5 g of $NH_4Br$ and 10.0 g of trimellitated gelatin (average molecular weight:approx. 100,000) were dissolved. The pH value of the solution was adjusted at 8.4 by addition of aqueous ammonia, to prepare 1,641 mL of a mother solution. The mother solution was placed in a reaction vessel equipped with a stirrer, and stirred at 30° C. Thereafter, except for using the thus-prepared mother solution, the procedures of Example 1 were repeated to obtain a precursor and a phosphor of europium activated barium fluoride bromide of the invention in the form of particles.

It was confirmed, by means of scanning electron microscope, that the phosphor particles and the precursor particles were spherical.

EXAMPLE 6

In water, 783.5 g of $NH_4Br$ and 10.0 g of trimellitated gelatin (average molecular weight:approx. 100,000) were dissolved. The pH value of the solution was adjusted at 9.9 by addition of aqueous ammonia, to prepare 1,641 mL of a mother solution. The liquid was placed in a reaction vessel equipped with a stirrer, and stirred at 30° C. Thereafter, except for using the thus-prepared mother solution, the procedures of EXAMPLE 1 were repeated to obtain a precursor and a phosphor of europium activated barium fluoride bromide of the invention in the form of particles.

It was confirmed, by means of scanning electron microscope, that the phosphor particles and precursor particles were spherical.

COMPARISON EXAMPLE 1

In water, 783.5 g of $NH_4Br$ alone was dissolved. The pH value of the solution was adjusted at 8.4 by addition of aqueous ammonia, to prepare 1,641 mL of a mother solution. The mother solution was placed in a reaction vessel equipped with a stirrer, and stirred at 30° C. Thereafter, except for using the thus-prepared mother solution, the procedures of Example 1 were repeated to obtain a precursor and a phosphor of europium activated barium fluoride bromide for comparison in the form of particles.

It was confirmed, by means of scanning electron microscope, that the phosphor particles and precursor particles were tabular.

COMPARISON EXAMPLE 2

In water, 401.8 g of $NH_4Br$ and 10.0 g of trimellitated gelatin (average molecular weight:approx. 100,000) were dissolved. The pH value of the solution was adjusted at 8.4 by addition of aqueous ammonia, to prepare 1,641 mL of a mother solution. The mother solution was placed in a reaction vessel equipped with a stirrer, and stirred at 30° C. Thereafter, except for using the thus-prepared reaction mother liquid, the procedures of Example 1 were repeated to obtain a precursor and a phosphor of europium activated barium fluoride bromide for comparison in the form of particles.

It was confirmed, by means of scanning electron microscope, that most of the phosphor particles and the precursor particles were in irregular shapes. Further, according to the X-ray diffraction, it was found that the precursor particles were contaminated with $BaF_2$ particles.

COMPARISON EXAMPLE 3

In water, 783.5 g of $NH_4Br$ and 10.0 g of trimellitated gelatin (average molecular weight:approx. 100,000) were dissolved. The pH value of the solution was adjusted at 8.4 by addition of aqueous ammonia, to prepare 1,641 mL of a mother solution. The mother solution was placed in a reaction vessel equipped with a stirrer, and stirred at 85° C. Thereafter, except for using the thus-prepared reaction mother liquid, the procedures of Example 1 were repeated to obtain a precursor and a phosphor of europium activated barium fluoride bromide for comparison in the form of particles.

It was confirmed, by means of scanning electron microscope, that the phosphor particles and the precursor particles were in the thick tabular shape.

COMPARISON EXAMPLE 4

In water, 783.5 g of $NH_4Br$ and 40.0 g of gelatin (average molecular weight:approx. 100,000) were dissolved. The pH value of the solution was adjusted at 2.0 by addition of nitric acid, to prepare 1,641 mL of a mother solution. The mother solution was placed in a reaction vessel equipped with a stirrer, and stirred at 40° C. Thereafter, except for using the thus-prepared mother solution, the procedures of Example 1 were repeated to obtain a precursor and a phosphor of europium activated barium fluoride bromide for comparison in the form of particles.

It was confirmed, by means of scanning electron microscope, that most of the phosphor particles and the precursor particles were tabular.

COMPARISON EXAMPLE 5

(1) Preparation of Phosphor Precursor

In a reaction vessel equipped with a stirrer, 1,200 mL of barium bromide aqueous solution (2.5 mol/L), 40 mL of europium bromide aqueous solution (0.2 mol/L), 0.85 g of calcium bromide dihydrate, and 1,760 mL of water were mixed to prepare a mother solution (concentration of $BaBr_2$:1.0 mol/L). Trimellitated gelatin (average molecular weight:approx. 100,000) was dissolved in the mother solution so that its concentration became 6.1 g/L, and stirred at 60° C.

To the mother solution, a mixture of 150 mL of aqueous ammonium fluoride solution (10 mol/L) and 150 mL of water was added at a constant pouring rate. While the mixture are poured, the temperature of the mother solution was kept at 60° C.

Successively, 100 mL of an aqueous protease solution (containing 0.5 g of protease) was added to the mother solution, which was then ripened for 2 hours.

Thereafter, precipitated particles of the phosphor precursor were collected by filtration. The phosphor precursor particles were washed with 2 L of methanol, and dried in vacuum at 120° C. for 4 hours. Thus, 340 g of precursor particles of europium activated barium fluoride bromide ($Ba_{0.998}Ca_{0.002}FBr$:0.005Eu) for comparison were obtained in the form of particles.

(2) Preparation of Phosphor

To the obtained phosphor precursor particles, an alumina fine powder was added in the amount of 1 wt. %. After mixed well with a mixer, the mixture was stuffed in a quartz boat and fired in a tube furnace. The firing was conducted at 850° C. under nitrogen gas atmosphere for 2 hours. Thus, europium activated barium fluoride bromide ($Ba_{0.998}Ca_{0.002}FBr$:0.005Eu) phosphor for comparison was obtained in the form of particles.

The above-described procedures are the same as that described in Example 4 in Japanese Patent Provisional Publication No. 7-233369, except that gelatin was added to the mother solution and that the aqueous solution of protease was added to the solution after the reaction was complete.

It was confirmed, by means of scanning electron microscope, that the phosphor particles and the precursor particles were in the thick tabular shape.

The phosphor precursor particles prepared in the above-mentioned examples, the conditions of preparation, and the particle sizes and shapes are set forth in Table 1. FIG. 1 shows an electron micrograph of the precursor particles prepared in Example 1.

TABLE 1

| | water-soluble polymer material | | |
|---|---|---|---|
| | polymer | average molecular weight | concentration (g/L) |
| Ex. 1 | gelatin | 100,000 | 24.4 |
| Ex. 2 | phthalated gelatin | 100,000 | 12.2 |
| Ex. 3 | trimellitated gelatin | 100,000 | 6.1 |
| Ex. 4 | gelatin | 15,000 | 12.2 |
| Ex. 5 | trimellitated gelatin | 100,000 | 6.1 |
| Ex. 6 | trimellitated gelatin | 100,000 | 6.1 |
| C. Ex. 1 | — | — | 0.0 |
| C. Ex. 2 | trimellitated gelatin | 100,000 | 6.1 |
| C. Ex. 3 | trimellitated gelatin | 100,000 | 6.1 |
| C. Ex. 4 | gelatin | 100,000 | 24.4 |
| C. Ex. 5 | trimellitated gelatin | 100,000 | 6.1 |

TABLE 1-continued

| | concentration of $NH_4Br$ (mol/L) | reaction temperature (° C.) | reaction pH |
|---|---|---|---|
| Ex. 1 | 4.9 | 40 | 8.4 |
| Ex. 2 | 4.9 | 30 | 8.4 |
| Ex. 3 | 4.9 | 30 | 8.4 |
| Ex. 4 | 4.9 | 30 | 8.4 |
| Ex. 5 | 3.5 | 30 | 8.4 |
| Ex. 6 | 4.9 | 30 | 9.9 |
| C. Ex. 1 | 4.9 | 30 | 8.4 |
| C. Ex. 2 | 2.5 | 30 | 8.4 |
| C. Ex. 3 | 4.9 | 85 | 8.4 |
| C. Ex. 4 | 4.9 | 40 | 2.0 |
| C. Ex. 5 | — | 60 | 5.0 |

| | particles | | |
|---|---|---|---|
| | average size (μm) | coefficient of size variation | shape (sphericity %) |
| Ex. 1 | 4.0 | 26% | spherical (70) |
| Ex. 2 | 3.1 | 17% | spherical (90) |
| Ex. 3 | 2.2 | 11% | spherical (>95) |
| Ex. 4 | 0.7 | 20% | spherical (>95) |
| Ex. 5 | 1.9 | 14% | spherical (>95) |
| Ex. 6 | 0.6 | 9% | spherical (>95) |
| C. Ex. 1 | 3.2 | 47% | tabular |
| C. Ex. 2 | 2.3 | 27% | almost irregular |
| C. Ex. 3 | 8.8 | 35% | thick tabular |
| C. Ex. 4 | 3.3 | 45% | almost tabular |
| C. Ex. 5 | 3.8 | 31% | thick tabular |

Each phosphor precursor particle of the invention (Examples 1 to 6) was prepared from the mother solution containing gelatin, and was left to grow under the specific conditions. As is evident from Table 1 and FIG. 1, the precursor particles thus-prepared in each of Examples 1 to 6 had a percentage of sphericity of 70% or more, which means they were spherical. Further, the particles had a coefficient of size variation of 30% or less, which means they were monodispersed. In particular, the precursors of Examples 3, 5 and 6 were in the form of highly spherical and monodispersed particles (percentage of sphericity: 95% or more, coefficient of size variation: 15% or less).

On the other hand, the particles of the phosphor precursor for comparison (Comparison Example 1) were prepared from the mother solution containing no gelatin, and let to grow without gelatin. The thus-prepared particles were tabular, and had the coefficient of size variation of 47% (which means they were multi-dispersed). Even if the mother solution contained gelatin, the phosphor particles of Comparison Examples 2 to 5 were in tabular or irregular shapes and were liable to be multidispersed because the reaction conditions were not proper.

According to the present invention, a precursor of rare earth activated barium fluoride halide phosphor in the form of spherical and monodispersed particles can be easily prepared by the liquid phase reaction process in which the reaction is allowed to proceed in the presence of a water-soluble polymer material under the specific conditions. The precursor particles are fired to give a rare earth activated barium fluoride halide phosphor in the form of spherical and monodispersed particles.

Since the phosphor of the invention is in the form of spherical and monodispersed particles, it can be evenly and densely dispersed in a binder. Further, as compared with conventional phosphors in the form of tabular particles, the emission is kept from diffusing horizontally. Accordingly, the phosphor of the invention can be advantageously used in a radiographic intensifying screen and a radiation image storage panel.

What is claimed is:

1. Non-luminescent spherical rare earth activated barium fluoride halide particles having the following formula (I):

$$Ba_{1-a}M^{II}{}_aFX:yM^I,zLn \qquad (I)$$

in which $M^{II}$ is at least one alkaline earth metal selected from the group consisting of Ca and Sr; $M^I$ is at least one alkali metal selected from the group consisting of Li, Na, K, Rb and Cs; X is at least one halogen selected from the group consisting of Cl, Br and I; Ln is at least one rare earth element selected from the group consisting of Ce, Pr, Nd, Pm, Sm, Eu, Gd, Tb, Dy, Ho, Er, Tm, Yb and Lu; and a, y and z are numbers satisfying the conditions of $0 \leq a \leq 0.5$, $0 \leq y \leq 0.05$, and $0 < z \leq 0.2$, respectively.

2. Non-luminescent particles of claim 1, wherein the particles have a percentage of sphericity of 50% or more, the percentage of sphericity indicating a percentage of surface areas other than crystal faces based on a total surface area of the particles.

3. The non-luminescent particles of claim 2, wherein the percentage of sphericity is 70% or more.

4. The non-luminescent particles of claim 3, wherein the percentage of sphericity is 90% or more.

5. Non-luminescent particles of claim 1, wherein the particles have a mean size in the range of 0.1 to 20.0 μm.

6. The non-luminescent particles of claim 5, wherein the mean particle size is in the range of 0.2 to 10.0 μm.

7. Non-luminescent particles of claim 1, wherein the particles have a coefficient of variation of 30% or less.

8. The non-luminescent particles of claim 7, wherein the coefficient of variation is 20% or less.

9. Non-luminescent particles of claim 1, wherein Ln in the formula (I) is Ce or Eu.

10. Non-luminescent particles of claim 1, wherein X in the formula (I) is Br and/or I.

11. A process for preparing spherical rare earth activated barium fluoride halide phosphor particles, having the following formula (I):

$$Ba_{1-a}M^{II}{}_aFX:yM^I,zLn \qquad (I)$$

in which $M^{II}$ is at least one alkaline earth metal selected from the group consisting of Ca and Sr; $M^I$ is at least one alkali metal selected from the group consisting of Li, Na, K, Rb and Cs; X is at least one halogen selected from the group consisting of Cl, Br and I; Ln is at least one rare earth element selected from the group consisting of Ce, Pr, Nd, Pm, Sm, Eu, Gd, Tb, Dy, Ho, Er, Tm, Yb and Lu; and a, y and z are numbers satisfying the conditions of $0 \leq a \leq 0.5$, $0 \leq y \leq 0.05$, and $0 < z \leq 0.2$, respectively; which comprises the steps of:

dissolving at least a water-soluble polymer material and a halide containing an X ion in an aqueous medium, whereby preparing an aqueous solution in which the X ion is dissolved in an amount of 3.0 mol/L or more and which has a pH value in the range of 5.0 to 14.0 and a temperature in the range of 0° C. to 80° C.;

mixing an aqueous barium compound solution, an aqueous fluoride solution, and an aqueous X ion-containing halide solution with the aqueous solution prepared in the first step while a resulting mixture solution is kept at a temperature in the range of 0° C. to 80° C., whereby forming barium fluoride halide particles in the mixture solution, removing the water-soluble polymer material from the mixture solution containing the barium fluoride halide particles;

mixing the mixture solution from which the water-soluble polymer material is removed with an aqueous solution containing a rare earth compound, an alkaline earth metal compound and an alkali metal compound, the alkaline earth metal compound being not contained in the case of a=0 and the alkali metal compound being not contained in the case of y=0, whereby precipitating spherical rare earth activated barium fluoride halide particles;

separating the spherical rare earth activated barium fluoride halide particles from the resulting mixture solution; and firing the spherical rare earth activated barium fluoride halide particles whereby obtained the spherical rare earth activated barium fluoride halide phosphor particles.

12. The process of claim 11, wherein the water-soluble polymer material has an average molecular weight in the range of 10,000 to 200,000.

13. The process of claim 12, wherein the water-soluble polymer material is gelatin.

14. The process of claim 13, wherein the gelatin is a modified gelatin which has at least one carboxyl group per one amino group of the gelatin.

15. The process of claim 14, wherein the modified gelatin is a phthalated gelatin.

16. The process of claim 13, wherein the gelatin is a modified gelatin which has at least two carboxyl groups per one amino group of the gelatin.

17. The process of claim 16, wherein the modified gelatin is a trimellitated gelatin.

18. The process of claim 11, wherein the X ion is dissolved in the aqueous solution prepared in the first step in an amount of 4.0 mol/L or more.

19. The process of claim 11, wherein the halide containing an X ion which is employed in the first step is ammonium bromide.

20. The process defined of claim 11, wherein the temperature of the solution in the first and second steps is in the range of 5° C. to 60° C.

21. The process defined of claim 11, wherein the temperature of the solution in the first and second steps is in the range of 10° C. to 40° C.

22. The process of claim 11, wherein the pH value in the first step is in the range of 7.0 to 13.0.

23. The process of claim 11, wherein the pH value in the first step is in the range of 8.0 to 12.0.

24. The process of claim 11, wherein the barium compound in the second step is barium acetate.

25. A method for preparing spherical rare earth activated barium fluoride halide phosphor particles, having the following formula (I):

$$Ba_{1-a}M^{II}{}_aFX:yM^I,zLn \qquad (I)$$

in which $M^{II}$ is at least one alkaline earth metal selected from the group consisting of Ca and Sr; $M^I$ is at least one alkali metal selected from the group consisting of Li, Na, K, Rb and Cs; X is at least one halogen selected from the group consisting of Cl, Br and I; Ln is at least one rare earth element selected from the group consisting of Ce, Pr, Nd, Pm, Sm, Eu, Gd, Tb, Dy, Ho, Er, Tm, Yb and Lu; and a, y and z are numbers satisfying the conditions of $0 \leq a \leq 0.5$, $0 \leq y \leq 0.05$, and $0 < z \leq 0.2$, respectively;

which comprises firing a spherical rare earth activated barium fluoride halide particles which has a luminance less than a luminance given by the spherical rare earth activated barium fluoride halide phosphor particles.

* * * * *